UNITED STATES PATENT OFFICE.

ANDREW DOUDES, OF CANTON, OHIO.

IMPROVED ELASTIC CEMENT FOR ROOFING.

Specification forming part of Letters Patent No. 52,978, dated March 6, 1866.

*To all whom it may concern:*

Be it known that I, ANDREW DOUDES, of Canton, in the county of Stark and State of Ohio, have invented certain new and useful Improvements in Elastic Cement for Roofing and Plastering; and I do hereby declare that the following is a full and clear description of the mode of making said elastic cement.

I use four ingredients, the proportions in which they are used to be varied slightly, according to the nature of the roof or wall to be cemented.

Cement for general use can be made as follows: Four (4) parts coal-tar, ten (10) parts flour of lime, one (1) part of hair, and two (2) parts of sand. If I wish to make the cement harder, I use fourteen (14) parts of lime to the above proportions of the other ingredients.

It will be readily understood that the proportions above given are not absolutely necessary, as the articles can be mixed in different proportions from those named. Sand can be used in some cases in greater proportions than those stated, thus making the cement cheaper.

This cement is elastic, and is not injured by either the heat of summer or the cold of winter. It neither runs by heat nor cracks by cold.

Having thus fully described my invention, what I claim as new, and desire to secure by Letters Patent, is—

The employment of the within-described ingredients for making an elastic cement, used together substantially in the manner herein specified.

As evidence that I claim the foregoing I have hereunto set my hand in the presence of two witnesses.

ANDREW DOUDES.

Witnesses:
W. W. CLARK,
C. A. THURSTON.